United States Patent [19]

Humiston

[11] 4,302,297
[45] Nov. 24, 1981

[54] DESALINATION APPARATUS WITH POWER GENERATION

[76] Inventor: Gerald F. Humiston, Apt. E202, 2909 Gulf To Bay Blvd., Clearwater, Fla. 33519

[21] Appl. No.: 165,778

[22] Filed: Jul. 3, 1980

Related U.S. Application Data

[63] Continuation of Ser. No. 799,968, May 24, 1977, abandoned.

[51] Int. Cl.³ ........................... C02F 1/04; B01D 3/10
[52] U.S. Cl. .............................. 202/185 R; 202/197;
202/202; 202/205; 60/641.7; 60/648; 203/1;
203/11; 203/40; 203/100; 203/DIG. 16;
203/DIG. 20
[58] Field of Search .................... 202/185 R, 181, 205,
202/202, 197; 203/10, 11, DIG. 17, 1, 91, 100,
DIG. 20, DIG. 16, 40; 60/641, 648

[56] References Cited

U.S. PATENT DOCUMENTS

| | | | |
|---|---|---|---|
| 1,445,134 | 2/1923 | Fowler | 203/11 |
| 1,966,938 | 7/1934 | Stone | 203/10 |
| 2,006,985 | 7/1935 | Claude et al. | 203/10 |
| 2,636,129 | 4/1953 | Agnew | 202/185 R |
| 3,032,482 | 5/1962 | Shoemaker | 203/DIG. 20 |
| 3,080,302 | 3/1963 | Rogers et al. | 202/185 R |
| 3,158,554 | 11/1964 | Moore | 202/202 |
| 3,269,919 | 8/1966 | Baily et al. | 202/202 |
| 3,468,762 | 9/1969 | Klitzsch | 203/DIG. 20 |
| 3,928,145 | 12/1975 | Othmer | 203/11 |

*Primary Examiner*—Wilbur L. Bascomb, Jr.
*Attorney, Agent, or Firm*—Stein & Frijouf

[57] ABSTRACT

An apparatus for desalinating ocean waters by distillation and furnishing electrical power, utilizes an evaporator, barometric leg conduits, a closed condenser, ocean water circulating circuits for circulating warm surface water to the evaporator and cool ocean water to the condenser and using the mass flow of vapors evolved from the evaporator to drive a prime mover which in turn drives an electrical generator. A portion of the electrical power so-generated is used to control the operation of respective pumps and valves in the apparatus. The liquid level of the condensate water is controlled in a barometric leg condensate outlet conduit. The system is also provided with a vacuum pump at least for initiating a reduced pressure and particle separator channel means is provided to prevent liquid entrainment in the condenser.

6 Claims, 1 Drawing Figure

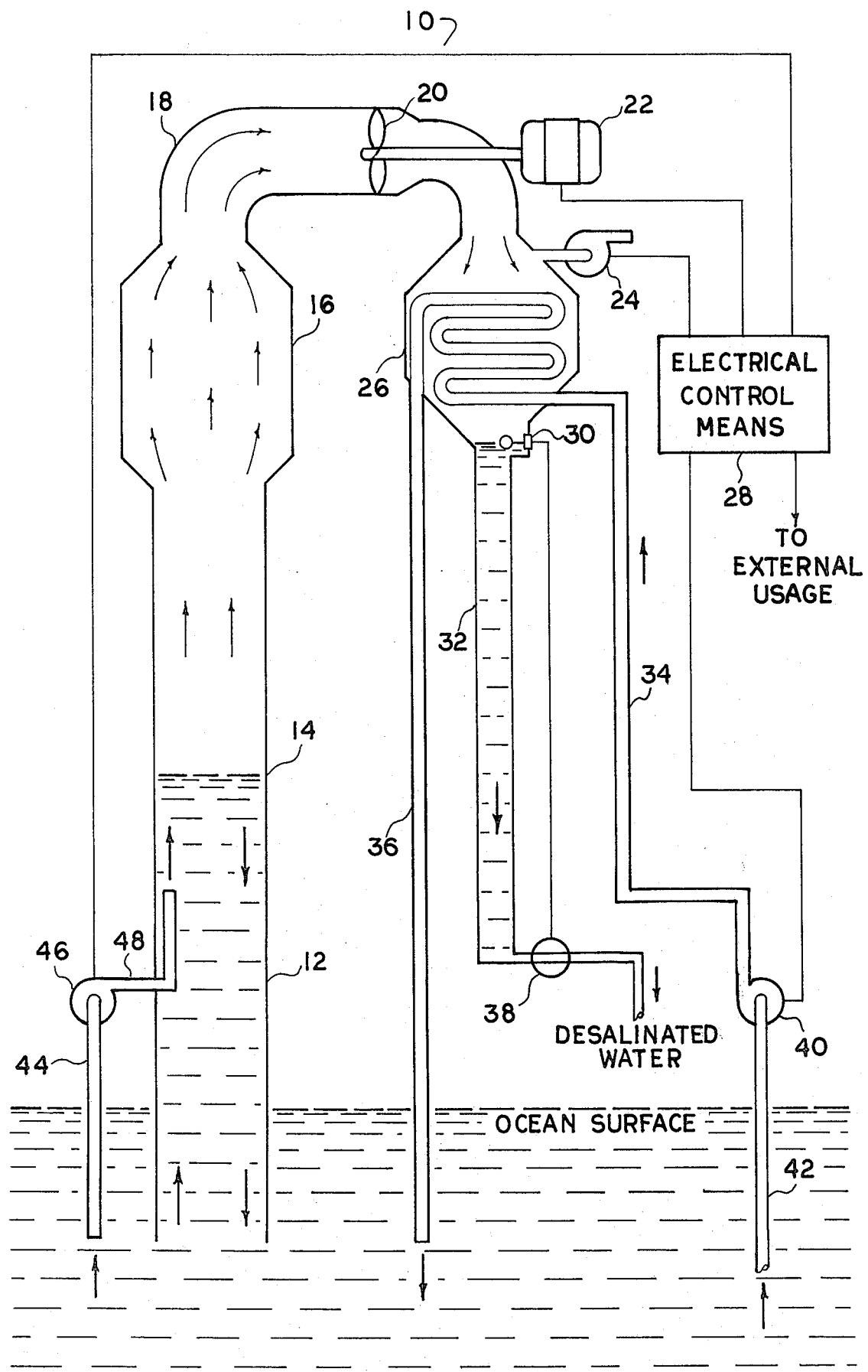

DESALINATION APPARATUS WITH POWER GENERATION

This is a continuation of application Ser. No. 799,968 Filed May 24, 1977, now abandoned.

BACKGROUND OF THE INVENTION

1. Field of the Invention

This invention relates to a heat pump process and apparatus which is applicable to desalination and power generation, water distillation and power generation, cooling of thermal plant cooling water discharges. More particularly this invention relates to a process and apparatus comprising an evaporator and a condenser where the heating and cooling sources are both obtained from the ocean waters and the products of the process are distilled or desalinated water and electrical energy in excess of that required to operate the apparatus as a result of the mass flow of vapors between the evaporator and the condenser driving a prime mover coupled to an electrical generator.

2. Description of the Prior Art

The shortage of oil and natural gas is rapidly becoming a significant problem for manufacturers and producers in the United States. The increasing price of fossilized fuel presents a very serious problem to producers of electrical energy and to desalination plants in particular. Accordingly, other sources of energy are being investigated and it is natural that the oceans of the world are being investigated particularly in those areas of the ocean such as the Gulf of Mexico, the Gulf stream off Florida, the Carribbean and the equatorial waters in the Atlantic and Pacific oceans where considerable temperature differences exist between the surface waters, say 78° F. to 88° F., and the deep water several thousand feet deep, say 40° F. The natural approach to the utilization of these differential temperatures has led to research of various refrigeration cycles using the warm surface water to 'boil' a low boiling point refrigerant such as ammonia or freon and the cold deep water to effect condensing of the refrigerant. A turbine type of device in the refrigerant loop would drive electrical generators to produce electricity and to further operate desalination plants.

In the very areas where the ocean waters provide significant temperature differentials, fossilized fuel is used to operate large desalination plants for the conversion of ocean or salt water to drinking water.

The thermal pollution as a result of hot water discharge from thermal and thermal nuclear generating plants and the usual nearby water cooling sources offer additional opportunities for devices using temperature differentials as energy sources.

Therefore an object of this invention is to provide a process and apparatus using ocean or other waters with high temperature differentials to produce distilled or desalinated water with excess electricity as an additional product. The balance of said outputs of distilled or desalinated water and electricity being a function of a particular individual design. This invention provides an improvement which is a significant improvement to the advancement of the art of distillation and desalination and the art of thermal energy conversion.

Another object of this invention is to provide a means whereby the oceans that are warmed by the sun and the cold deep ocean waters can be used directly to evaporate and condense ocean waters for effective desalinating.

Another object of this invention is to provide a means for using any sources of water that have large temperature differentials to operate an apparatus that distills or desalinates water and produces electrical energy.

Another object of this invention is to incorporate in said process and apparatus a means of using the vapors from the evaporating and condensing process to drive a prime mover which is connected to a generator providing the electrical energy to operate the apparatus and additionally to provide excess electrical energy for external usage.

Another object of this invention is to provide a process and apparatus with a barometric leg to maintain the process and apparatus at the saturation pressure level of the warm ocean water, or other warm water source, in the apparatus while permitting thermal circulation of the said warm water to the evaporator.

Another object of this invention is to provide a process and apparatus with a barometric leg at the condenser to permit removal of condensed vapors from the negative pressure of the system while maintaining this pressure.

Another object of this invention is to provide a process and apparatus with a vacuum pump to establish the initial saturation, or negative, pressure of the process and apparatus and to remove non-condensable vapors during operation of the process and apparatus.

Another object of this invention is to provide a process and apparatus with a pump and conduit means to bring deep ocean water, or other cooling water, in contact with the condenser and to return this condensing water to the ocean or other return source.

Another object of this invention is to provide a process and apparatus with an evaporator wherein ocean, or other warm water, is evaporated.

Another object of this invention is to provide a process and apparatus with a condenser wherein the vapors from the evaporator are brought into thermal contact with the condensing water in the condenser.

Another object of this invention is to provide a process and apparatus with a barometric conduit in contact with the evaporator and located between the evaporator and the ocean surface, or other warm water source, of such sufficient size as to allow thermal circulation of the ocean water, or other warm water source, in the barometric conduit to replace the warm water in the evaporator which is cooled when evaporation takes place removing the heat of vaporization from the surface of the warm water in the evaporator.

Another object of this invention is to provide a process and apparatus with a pump and conduit means to draw in warm surface ocean water, or other warm water source, and direct it upwardly in the barometric conduit between the evaporator and the ocean surface, or surface of any other warm water source, to induce and assist thermal circulation in the said barometric conduit.

Another object of this invention is to provide a process and apparatus with a particle separation chamber located above the evaporator and between the evaporator and the conduit connecting the vaporator and the condenser. This particle separation means comprises an enlarged chamber wherein the vapors from the evaporator are reduced in velocity thereby allowing liquid or particles to settle back into the evaporator.

Another object of this invention is to provide a process and apparatus with a barometric conduit at the condenser, a liquid level control at the top of the barometric conduit and a condensate water out valve at the bottom of the said conduit to maintain the desired height of condensate water in the barometric conduit and, the outlet pressure of the condensate water at the outlet valve.

Another object of this invention is to provide a process and apparatus with an electrical control to direct electrical energy from the electrical generator to the elements of the apparatus that require power such as the vacuum pump, cooling water pump, and recirculating pump and to direct any excess electrical power for external usage.

Another object of this invention is to provide a process and an apparatus with a means of using ocean water, as other warm water source, as the refrigerant fluid, eliminating the necessity of additional refrigerants. The vapors of the fluid water, to be, as a result of the process, will be at the saturation pressure corresponding to the temperatures in the various portions of the apparatus.

Another object of this invention is to provide a process and an apparatus with a heat source, a conduit having sufficient height as to form a barometric leg, a pump and conduit means to induce and direct circulation in the barometric leg, an evaporator means, a particle separation means, a conduit means to connect said evaporator means to a condenser means, a prime mover interposed in said conduit means, a generator means coupled to said prime mover means, an electrical control means, a condenser means, pump and conduit means to pump cooling water to said condenser means and to return the condensing or cooling water to the cooling water source, a conduit from said condenser means of such height as to form a barometric leg and having additional height as to obtain the desired pressure of condensate water in the said barometric conduit means to remove the same from the apparatus, a level control, a condensate water out valve and a vacuum pump means.

Other objects and a fuller understanding of this invention may be had by referring to the summary of the invention, the description and the claims, taken in conjunction with the accompanying drawing.

SUMMARY OF THE INVENTION

The invention may be incorporated into a distilling or desalination apparatus with power generation comprising a conduit connecting an evaporator to the surface of the ocean, or other warm water source, and having sufficient height as to form a barometric leg in which the ocean water, or other warm water source, will only rise to the level determined by the magnitude of the negative pressure or the saturation pressure which is a function of the temperature of the warm water source in the evaporator section of the apparatus. An evaporator means with an attached particle separation chamber is connected by a conduit means to a condenser means. A prime mover of the turbine type or the positive displacement type is interposed into the said conduit means. A generator means coupled to the said prime mover means converts the power generated by the prime mover means to electrical energy. A pump and conduit means delivers cold deep water or other cooling water to a condenser and returns the cooling or condensing water to the cooling water source. A conduit means connected to the condenser means has sufficient height to create a pressure head equal to the sum of the difference between the atmospheric pressure and the pressure within the apparatus, plus the desired head pressure at the condensate water outlet. Valve means is connected to the condensate water outlet allows removal of condensate water from the apparatus. A liquid level control means is located at the top of the barometric conduit means to control the condensate water out valve means for the purpose of allowing condensate water out of the said condensate water out valve in such a manner as to control the desired height of condensate water in the said barometric conduit means. A vacuum pump means initially reduces the pressure in the apparatus to the saturation pressure of the ocean water, or other warm water source, and then further removes any non-condensable vapors from the apparatus during operation. An electrical control means connects the output of the electrical generator means to the elements of the apparatus which require power such as the cold water pump, the vacuum pump, and the recirculating pump, thereby making the process self sustaining with only the differential temperatures in the heating and cooling waters providing the power for the apparatus. A pump and conduit means draws in warm surface ocean water, or other warm water source, and directs the warm water upwardly in the barometric conduit between the evaporator means and the ocean surface, or surface of other warm water source, to induce and assist thermal circulation in the said barometric conduit means.

A fundamental characteristic of the heat pump system, comprises a closed loop system established between an evaporator means where a fluid, in this case warm water, is evaporated and becomes a vapor carrying with it the heat of vaporization, and a condenser means wherein the vapor is condensed thereby liberating the heat of condensation. In the case of the subject invention, the heat to the evaporator means is furnished by warm surface ocean water, or other warm water source, and the cooling means for the condenser means is furnished by cold deep ocean water, or other cooling water source. The prime mover means interposed in the closed loop provides the power to drive an electrical generator means and supplies power to an electrical control means to direct electrical energy to the elements of the apparatus thereby providing distilled or desalinated water in addition to excess electrical energy for external usage. Barometric conduits allow entry and exit of the warm water source and the exit of condensate water, now distilled or desalinated, from the apparatus. A vacuum pump establishes the initial negative pressure of the apparatus and during operation removes any non-condensable vapors. The practice of the instant invention enables a distillation of desalination apparatus with power generation to utilize the differential temperatures present in the ocean, and such other sources of water in which temperature differentials are present, to produce distilled or desalinated water and electrical energy.

This invention accordingly comprises a process and an apparatus possessing the features, properties and the relationship of elements which will be exemplified in the article hereinafter described, and the scope of the invention will be indicated in the claims.

BRIEF DESCRIPTION OF THE DRAWING

For a fuller understanding of the nature and objects of the invention, reference should be had to the following detailed description taken in connection with the accompanying drawing in which:

FIG. 1 illustrates a desalination apparatus with power generation.

DETAILED DESCRIPTION OF THE DRAWING

The drawing illustrates a desalination apparatus with power generation 10 including an evaporator 14 and a condenser 26. The evaporator 14 is connected to the surface of the ocean by means of a conduit 12. Said conduit 12 being of sufficient height that the ocean water will rise to the desired level in the evaporator 14, taking into account the variation in the levels of the ocean, when the evaporator 14 is at the saturation pressure for the corresponding temperature of the ocean water. Said conduit is also of such sufficient size as to permit thermal circulation of the ocean water in said conduit 12 to allow the warm surface ocean water to rise to the evaporator 14 to replace the ocean water in the evaporator 14 that becomes cooled as ocean water evaporates taking with it the heat of vaporization. A pump means 46 draws warm surface ocean water through conduit 44 and discharges it through conduit 48 upwardly in conduit 12 to induce and assist in thermal circulation. A particle separation chamber 16 is located above the evaporator 14 of such diameter that the vapors from the evaporator 14 are sufficiently reduced in velocity to prevent particles or liquid from reaching other portions of the system. Conduit 18 connects the evaporator 14 and the particle separation chamber to a condenser 26. Although there are various types of condensers, for ease of illustration condenser 26 is a simple serpentine condenser and more elaborate types of condensers such as plate or tubular would be used on given designs. Vapors from the evaporator 14 come in thermal contact with the condenser 26 and condenses thereby liberating the heat of condensation to the condensing water in the condenser 26. A prime mover 20 is interposed in the conduit 18 deriving power from the mass flow of vapors which flow from the evaporator 14 to the condenser 26 and the pressure difference then existing between the evaporator 14, which is at the saturation pressure for the temperature of the warm surface ocean water, and the condenser 26 which is at the saturation pressure for the temperature of the colder sub-surface ocean water. The type of prime mover is, for clarity, shown as a simple axial turbine, although the variety of applications of the invention might dictate other prime movers such as multistage turbines, roots type positive displacement prime movers, and others well known and used to derive rotary motion from the flow of vapors. An electrical generator 22 is coupled to the prime mover 20 and converts the power of the prime mover 20 to electrical energy. An electrical control 28 directs the electrical power from the generator 22 to operate the various elements of the apparatus and to direct such excess electrical power for external usage. A conduit 42 is extended deep into the ocean to a depth satisfactory to obtain cold ocean water and is brought to the inlet of a pump 40 which is the means of pumping cold ocean water to the condenser 26 through conduit 34. This cold or condensing water is returned to the ocean from the condenser 26 through a conduit 36. Conduit 32 is connected to the condenser 26 and is of such height as to create a head pressure equal to the difference in atmospheric pressure and the pressure in the condenser 26 plus a height sufficient to give the desired head pressure at the condensate water valve 38. A liquid level control 30 located at the top of conduit 32 controls the condensate water valve 38 and allows the valve to discharge condensate water while maintaining the desired head in conduit 32. Vacuum pump 24 is connected to the condenser 26 and initially reduces the pressure in the apparatus to the initial saturation pressure of the ocean water and subsequently removes any noncondensable vapors from the process during operation.

The process is instituted initially by the vacuum pump 24 evacuating the air from the closed system. The vacuum pump 24 reduces the pressure in the closed system until the pressure in the system reaches the saturation pressure dictated by the temperature of the ocean surface water. In the case of surface ocean water at 80° F. the pressure left in the apparatus 10 would be the saturation pressure of water at 80° F. or approximately 0.507 psia. With the continued operation of the vacuum pump 24, the closed apparatus 10 then fills with water vapor at the saturation temperature and pressure of 80° F. and 0.507 psia.

Because of the difference in the pressure in the closed apparatus 10 and the pressure of the atmospheric air surrounding the closed apparatus 10, the ocean water in conduit 12 rises until the head pressure at the ocean surface is equal to the atmospheric pressure. In the case of atmospheric pressure at 14.7 psia, the difference in pressure between the inside of the closed apparatus 10 and the atmospheric pressure outside the closed apparatus 10 would be approximately 14.193 psi and would therefore cause the ocean water in conduit 12 to rise approximately 31.8 feet above the surface of the ocean.

The pump 40 is then started to draw cold deep ocean water through conduit 42 and pump the same through conduit 34 to the condenser 26. Conduit 36 returns the condensing water to the ocean. Cold water flowing through the condenser 26 cause the water vapors thereby to condense in the condenser 26 releasing the heat of condensation to the condensing water. The warmer vapors present in the evaporator 14 flow to the condenser 26 portion of the apparatus 10 where they are condensed to a liquid. The rapid flow of vapors existing from the evaporator 14 to the condenser 26 is caused by the reduction in volume of the vapors in the condenser 26 as they are condensed to a liquid and the difference in the saturation pressure in the evaporator 14 and the lower saturation pressure in the condenser 26 as a result of the lower temperature of the condensing water in the condenser 26. This difference in pressure between the evaporator 14 and the condenser 26 and the mass flow of vapors, low temperature steam, from the evaporator 14 to the condenser 26 drives the prime mover 20 located in the conduit 18 between the evaporator 14 and the condenser 26. Power is thus provided to the electrical generator 22 which is coupled to the prime mover 20. Heat for continued evaporation in the evaporator 14 is supplied by the thermal circulation of the warm surface ocean water in conduit 12. This thermal circulation is induced and assisted by pump 46 which draws warm surface ocean water through conduit 44 and discharges this flow through conduit 48 upwardly in conduit 12 thus establishing a non-random thermal circulation. The heat of vaporization lost to the vapors evaporated in the evaporator 14 are thus constantly replaced.

The vapors caused by evaporation in the evaporator 14 are pure water and do not contain the salts or minerals present in the ocean water. The evaporator 14 is separated from the condenser 26 by a particle separation chamber 16 and a vapor conduit 18, and the condensate water obtained as a result of the condensation of the vapors in the condenser 26 is desalinated, or distilled, water.

Condensate water from the condenser 26 collects in the conduit 32 until this condensate water reaches the liquid level control 30 at which time the liquid level control 30 then regulates the action of the condensate water valve 38 letting condensate water out of the apparatus 10 sufficiently to maintain the condensate water level in the conduit 32 at the liquid level control 30. The conduit 32 is of such height that the head of water in the conduit 32 is equal to the difference between the saturation pressure in the condenser 26 and the atmospheric pressure outside of the apparatus plus the desired pressure head at the condensate water valve 38.

It can thus be seen that the head of ocean water in the conduit 12 and the head of condensate water in the conduit 32 provides a means of bringing ocean water in contact with the evaporator 14 and removing condensate water from the condenser 26 even though the apparatus 10 is at a pressure considerably lower than that of the atmospheric air outside of the closed apparatus 10.

An electrical control 28 directs the electrical output of the generator 22 to necessary elements of the apparatus and the excess diverted for external usage. The apparatus has thus provided for itself a power source to sustain its own operation and provide external energy for other uses. During initial startup of the apparatus 10, since no electricity exists at the electrical control 28, the power to initiate the the process and apparatus 10 must be external and most easily could be provided by storage batteries which would be recharged during system operation.

A desalination apparatus with power generation providing desalinated water and electrical energy has thus been described. The temperature differential present at various parts in the ocean waters being the energy necessary to operate the said process and apparatus.

The foregoing process and apparatus has a substantial savings over that of the prior art in that no conventional energy sources are required to operate the apparatus so described.

The present disclosure includes that contained in the appended claims, as well as that of the foregoing description. Although this invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention.

Now that the invention has been described:
Having thus described the invention, I claim:

1. An apparatus for desalinating ocean waters and furnishing electrical power, comprising in combination:
   an evaporator;
   a first conduit for connecting said evaporator to the warm surface water of the ocean;
   said first conduit forming a barometric leg to separate the low internal pressure of the evaporator from the ambient atmospheric pressure during operation of said evaporator;
   means for circulating the ocean water between said evaporator and the warm surface water of the ocean to replace the heat of vaporization lost in the evaporator;
   a closed condenser comprising condenser cooling means connected by a second conduit to cool ocean water;
   a first pump interposed in said second conduit for circulating cool ocean water through said condenser cooling means to cool the vapors evaporated from said evaporator;
   said closed condenser isolating the vapors to be condensed from the cool ocean water;
   a third conduit connecting said evaporator to said condenser for directing evaporator vapors into thermal contact with said condenser cooling means;
   a prime mover interposed in said third conduit to be driven by the mass flow of vapors between said evaporator and said condenser resulting from the pressure differential between the saturated vapors in said evaporator and the saturated vapors in said condenser;
   a particle separation channel interposed between said evaporator and said condenser for reducing the velocity of vapors from said evaporator to prevent non-vapors from entering said condenser;
   a condenser conduit connected to said condenser for providing a barometric leg for the removal of condensed desalinated water from the lower pressure in said condenser to the higher pressure of the atmospheric air;
   a condensate water output valve located in said barometric leg for recovering the condensed desalinated ocean water therefrom;
   a liquid level control means to sense the level of the condensed desalinated ocean water in the barometric leg for controlling said condensate water output valve to maintain a desired level of condensed desalinated ocean water;
   a vacuum pump in fluid communication with said third conduit for initially reducing the internal vapor pressure in said evaporator for initiating operation of the apparatus;
   an electrical generator coupled to said prime mover for generating electrical power; and
   an electrical control system for connecting said electrical power for controlling said pumps and said valve.

2. An apparatus as set forth in claim 1, wherein said particle separation channel comprises a region having a greater cross-sectional area than said third conduit.

3. An apparatus for desalinating ocean waters and furnishing electrical power, comprising in combination:
   an evaporator;
   a first conduit for connecting said evaporator to the warm surface water of the ocean;
   said first conduit forming a barometric leg to separate the low internal pressure of the evaporator from the ambient atmospheric pressure during operation of said evaporator;
   pump means for circulating the ocean water between said evaporator and the warm surface water of the ocean to replace the heat of vaporization lost in the evaporator;
   a closed condenser comprising condenser cooling means connected by a second conduit to cool ocean water;

pump means interposed in said second conduit for circulating cool ocean water through said condenser cooling means to cool the vapors evaporated from said evaporator;

said closed condenser enabling heat exchange between the vapors from said evaporator and said cool ocean water in said condenser cooling means while isolating the vapors from the cool ocean water to prevent contamination of the condensed desalinated ocean water by the cool ocean water;

a third conduit connecting said evaporator to said condenser for directing evaporator vapors into thermal contact with said condenser cooling means;

a prime mover interposed in said third conduit to be driven by the mass flow of vapors between said evaporator and said condenser resulting from the pressure differential between the saturated vapors in said evaporator and the saturated vapors in said condenser;

a particle separation channel interposed between said evaporator and said condenser for reducing the velocity of vapors from said evaporator to prevent non-vapors from entering said condenser;

a condenser conduit connected to said condenser for providing a barometric leg for the removal of condensed desalinated water from the low pressure in said condenser to the higher pressure of the atmospheric air;

a condensate water output valve located in said barometric leg of said condenser conduit for controlling the liquid level of condensed desalinated ocean water in the barometric leg of said condenser conduit to recover the condensed desalinated ocean water therefrom;

a vacuum pump in fluid communication with said third conduit for initially reducing the internal vapor pressure in said evaporator for initiating operation of the apparatus;

an electrical generator coupled to said prime mover for generating electrical power; and an electrical control system for connecting said electrical power for controlling said pumps and said valve.

4. An apparatus for desalinating ocean waters and furnishing electrical power, comprising in combination:

an evaporator;

a first conduit for connecting said evaporator to the warm surface water of the ocean;

said first conduit forming a barometric leg to separate the low internal pressure of the evaporator from the ambient atmospheric pressure during operation of said evaporator;

means for circulating warm surface ocean water in said barometric leg to replace the heat of vaporization lost in the evaporator;

a closed condenser means connected by a second conduit to cool ocean water for cooling said condenser;

a first pump interposed in said second conduit for circulating cool ocean water through said condenser cooling means to cool the vapors evaporated from said evaporator;

said closed condenser isolating the vapors to be condensed from the cool ocean water;

a third conduit connecting said evaporator to said condenser for directing evaporator vapors into thermal contact with said condenser cooling means;

a prime mover interposed in said third conduit to be driven by the mass flow of vapors between said evaporator and said condenser resulting from the pressure differential between the saturated vapors in said evaporator and the saturated vapors in said condenser;

means interposed between said evaporator and said condenser for permitting only the vapors from said evaporator to enter said condenser;

a condenser conduit connected to said condenser for providing a barometric leg for the removal of condensed desalinated water from the lower pressure in said condenser to the higher pressure of the atmospheric air;

a condensate water output valve located in said barometric leg for recovering the condensed desalinated ocean water therefrom;

a liquid level control means to sense the level of the condensed desalinated ocean water in the barometric leg for controlling said condenser water output valve to maintain a desired level of condensed desalinated ocean water;

a vacuum pump in fluid communication with said third conduit for initially reducing the internal vapor pressure in said evaporator for initiating operation of the apparatus;

an electrical generator coupled to said prime mover for generating electrical power; and an electrical control system for connecting said electrical power for controlling said pumps and said valve.

5. An apparatus as set forth in claim 4, wherein said means permitting only the vapors from said evaporator to enter said condenser comprises a region having a greater cross-sectional area than said third conduit.

6. An apparatus for desalinating ocean waters and furnishing electrical power, comprising in combination:

an evaporator;

a first conduit for connecting said evaporator to the warm surface water of the ocean;

said first conduit forming a barometric leg to separate the low internal pressure of the evaporator from the ambient atmospheric pressure during operation of said evaporator;

pump means for circulating the warm surface ocean water to replace the heat of vaporization lost in the evaporator;

a closed condenser means connected by a second conduit to cool ocean water;

pump means interposed in said second conduit for circulating cool ocean water through said condenser cooling means to cool the vapors evaporated from said evaporator;

said closed condenser enabling heat exchange between the vapors from said evaporator and said cool ocean water in said condenser cooling means while isolating the vapors from the cool ocean water to prevent contamination of the condensed desalinated ocean water by the cool ocean water;

a third conduit connecting said evaporator to said condenser for directing evaporator vapors into thermal contact with said condenser cooling means;

a prime mover interposed in said third conduit to be driven by the mass flow of vapors between said evaporator and said condenser resulting from the pressure differential between the saturated vapors in said evaporator and the saturated vapors in said condenser;

a particle separation channel interposed between said evaporator and said condenser for reducing the velocity of vapors from said evaporator to prevent non-vapors from entering said condenser;

a condenser conduit connected to said condenser for providing a barometric leg for the removal of condensed desalinated water from the low pressure in said condenser to the higher pressure of the atmospheric air;

means located in said barometric leg of said condenser conduit for recovering the condensed desalinated ocean water therefrom at a controlled rate to maintain a selected range of head pressure;

a vacuum pump in fluid communication with said third conduit for initially reducing the internal vapor pressure in said evaporator for initiating operation of the apparatus;

an electrical generator coupled to said prime mover for generating electrical power; and an electrical control system for connecting said electrical power for controlling said pumps and said valve.

* * * * *

UNITED STATES PATENT AND TRADEMARK OFFICE
CERTIFICATE OF CORRECTION

PATENT NO. : 4,302,297

DATED : November 24, 1981

INVENTOR(S) : Gerald F. Humiston

It is certified that error appears in the above—identified patent and that said Letters Patent is hereby corrected as shown below:

Column 2, line 64 "vaparator" should read -- evaporator --.

Column 10, line 22, "condenser" should read -- condensate --.

Signed and Sealed this

Twenty-fifth Day of May 1982

[SEAL]

Attest:

Attesting Officer

GERALD J. MOSSINGHOFF

Commissioner of Patents and Trademarks